(12) United States Patent
Kokusho

(10) Patent No.: US 7,163,370 B2
(45) Date of Patent: Jan. 16, 2007

(54) GAS TURBINE ENGINE AND METHOD OF PRODUCING THE SAME

(75) Inventor: Tsuyoshi Kokusho, Kawagoe (JP)

(73) Assignee: Honda Motor Co., Ltd., Tokyo (JP)

(*) Notice: Subject to any disclaimer, the term of this patent is extended or adjusted under 35 U.S.C. 154(b) by 387 days.

(21) Appl. No.: 10/763,375

(22) Filed: Jan. 23, 2004

(65) Prior Publication Data

US 2005/0079050 A1   Apr. 14, 2005

(30) Foreign Application Priority Data

Jan. 23, 2003  (JP) .............................. 2003-015256

(51) Int. Cl.
 *F01D 11/12*  (2006.01)
(52) U.S. Cl. .................... 415/173.4; 415/200; 277/360
(58) Field of Classification Search ............. 415/173.4; 277/360
See application file for complete search history.

(56) References Cited

U.S. PATENT DOCUMENTS 5,059,095 A * 10/1991 Kushner et al. ............. 415/200
6,233,822 B1 * 5/2001 Grossklaus et al. ........ 29/889.1
2002/0197155 A1 * 12/2002 Howard et al. .......... 415/173.4

FOREIGN PATENT DOCUMENTS

JP  2001-152803  6/2001
JP  2001-303904  10/2001

* cited by examiner

*Primary Examiner*—Richard A. Edgar
(74) *Attorney, Agent, or Firm*—Lahive & Cockfield, LLP; Anthony A. Laurentano, Esq.

(57) ABSTRACT

A raw material powder having particle sizes of not more than 125 μm and preferably not more than 75 μm, such as a powder of an alloy of Co-32% Ni-21% Cr-7.5% Al-0.5% Y is thermally sprayed onto surfaces of shroud members of a shroud to form a coating. The high velocity oxygen-fuel thermal spray method is used as the thermal spray method. In the obtained coating, the porosity is 5% to 30% by volume and the oxygen content is not more than 2% by weight. In particular, when the raw material powder has particle sizes of about 40 μm, it is possible to obtain the coating which has an extremely small oxygen content of about 0.5% by weight.

8 Claims, 2 Drawing Sheets

GAS TURBINE ENGINE AND METHOD OF PRODUCING THE SAME

BACKGROUND OF THE INVENTION

1. Field of the Invention

The present invention relates to a gas turbine engine and a method of producing the same. In particular, the present invention relates to a gas turbine engine and a method of producing the same in which a casing is prevented from abrasion by a coating provided on a surface of the casing.

2. Description of the Related Art

When a gas turbine engine is operated, rotary vanes (turbine blades) and a rotor are driven and rotated in a shroud as a casing in accordance with the expansion of a high temperature combustion gas flowing through a gas flow passage.

In order to improve the efficiency of the rotary operation by increasing the pressure of the expanding combustion gas, the clearance between the turbine blade and the shroud is as small as possible. However, both of the turbine blade and the shroud cause thermal expansion, because the combustion gas is at a high temperature as described above. As a result, the turbine blade and the shroud may slide each other.

In order to avoid the breakage of the turbine blade even when the sliding contact occurs as described above, a hard layer called "abrasive layer" is usually provided on the turbine blade, and a soft layer called "abradable layer" is provided on the shroud. The abrasive layer may be made of materials such as stabilized zirconia, and the abradable layer may be made of materials such as cubic system BN(c-BN) and Ni—Co—Cr—Al—Y alloy.

When the turbine blade and the shroud are in sliding contact with each other, the soft abradable layer is easily abraded by the hard abrasive layer. Accordingly, the force acting on the turbine blade is decreased, and hence it is possible to prevent the turbine blade from breakage. Further, because the abrasion occurs in the abradable layer, it is also possible to prevent the shroud itself from abrasion.

In relation to the technique as described above, Japanese Laid-Open Patent Publication No. 2001-303904 suggests a gas turbine in which no abrasive layer is provided for turbine blades, but abrasion margins are provided for the turbine blades so that the abrasion margins are abraded upon abutment against a coating layer of a casing. Another gas turbine is also suggested, in which abrasive layers are provided for turbine blades, while no abradable layer is provided for a casing so that the abrasion occurs on the casing.

However, when the abrasion margin disappears in the invention of Japanese Laid-Open Patent Publication No. 2001-303904, the clearance between the gas turbine and the shroud is increased. Therefore, the efficiency may be deteriorated in relation to the rotary action of the gas turbine and the rotor. Further, it is necessary to exchange the gas turbine in order to enhance the efficiency again. Therefore, maintenance cost is high.

On the other hand, when the abrasion occurs on the casing, the casing is deformed. Therefore, it is necessary to finally exchange the casing.

SUMMARY OF THE INVENTION

A general object of the present invention is to provide a gas turbine engine which has a simple structure, which makes it possible to prevent rotary members and a casing from abrasion, and which reduces maintenance cost.

A principal object of the present invention is to provide a gas turbine engine which makes it possible to prevent a casing from thermal deformation.

Another object of the present invention is to provide a production method in order to obtain a gas turbine engine in which rotary members and a casing are hardly abraded, by high velocity oxygen-fuel thermal spray method.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment will be described below in relation to the gas turbine engine and the method of producing the same according to the present invention, which will be explained in detail with reference to the accompanying drawings.

Figure 1:
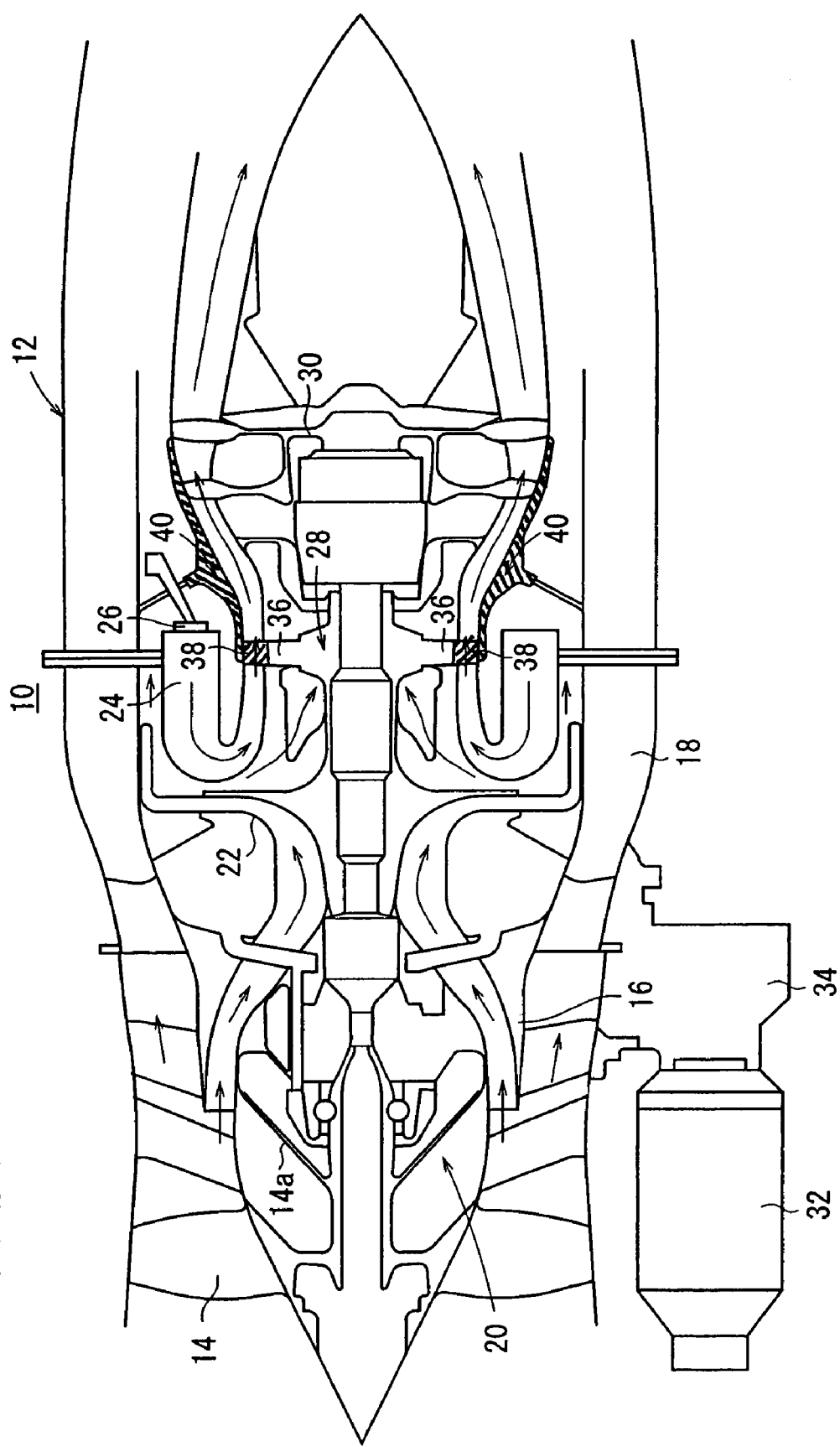
FIG. 1 is a schematic longitudinal sectional view illustrating a structure of a gas turbine engine according to an embodiment of the present invention.

FIG. 1 shows a schematic longitudinal sectional view illustrating a structure of a gas turbine engine according to the embodiment of the present invention. The gas turbine engine 10 is provided with a fan duct 12 and a fan 14. In particular, the fan 14 is rotated at a high speed to suck the air from the outside. The air is compressed, and it is fed backward under the pressure.

A fan bypass passage 18 is formed by a core duct 16 and the fan duct 12 in the vicinity of the fan 14. A thrust force is generated for an unillustrated airplane or the like which carries the gas turbine engine 10 by the air which is jetted backward through the fan bypass passage 18.

The fan 14 constitutes a low pressure compressor 20. The air compressed by the low pressure compressor 20 is fed to a high pressure compressor 22 disposed downstream. The air compressed by the high pressure compressor 22 is further fed to a combustion chamber 24 disposed downstream.

A fuel nozzle 26 is arranged for the combustion chamber 24. The fuel fed under the pressure is injected from the fuel nozzle 26 to the combustion chamber 24. An air-fuel mixture obtained by mixing the fuel and the compressed air fed under the pressure from the high pressure compressor 22 is ignited and burned upon the start-up of the engine. Thus, the high temperature and high pressure gas is produced, which is at about 800° to 1200° C.

The high temperature and high pressure gas is fed to a high pressure turbine 28 to rotate the high pressure turbine 28 at a high speed. The high pressure turbine 28 rotates a rotor 14a of the fan 14. On the other hand, the high temperature and high pressure gas, which has driven and rotated the high pressure turbine 28, is fed to a low pressure turbine 30. The low pressure turbine 30 rotates the fan 14 and the rotor 14a of the low pressure compressor 20.

A starter generator 32, into which a starter and a generator are incorporated, is attached to an outer lower surface of the gas turbine engine 10 by an accessory gear box 34.

In the above arrangement, the high pressure turbine 28 has a rotor 36 and turbine blades 38 which are attached to the rotor 36. The turbine blades 38 are surrounded by a shroud 40. The shroud 40 is constructed by appropriately combining a plurality of shroud members.

Figure 2:
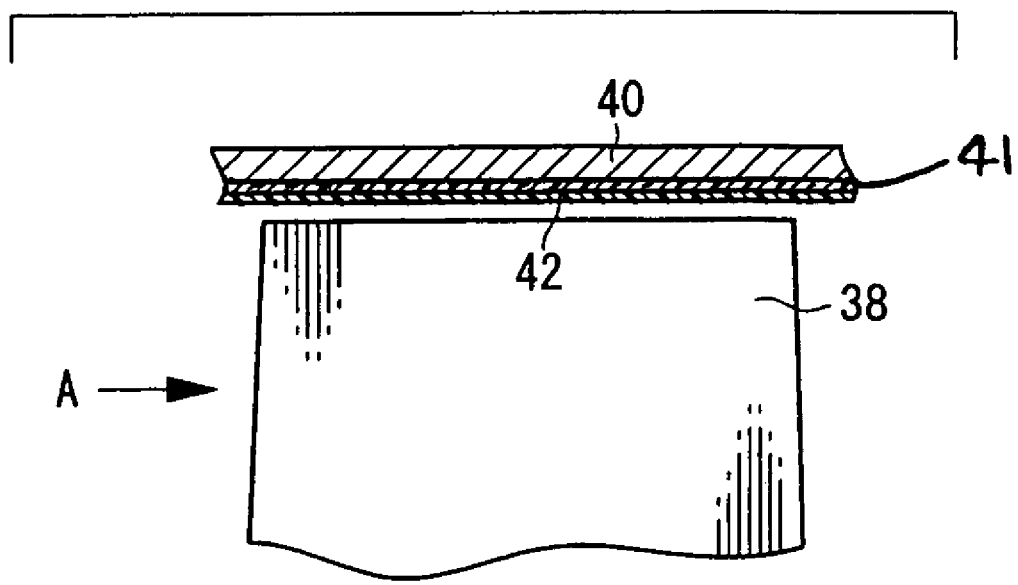
FIG. 2 is a magnified view illustrating major parts of a turbine blade of the gas turbine engine shown in FIG. 1 and a shroud for surrounding the turbine blade.
Figure 3:
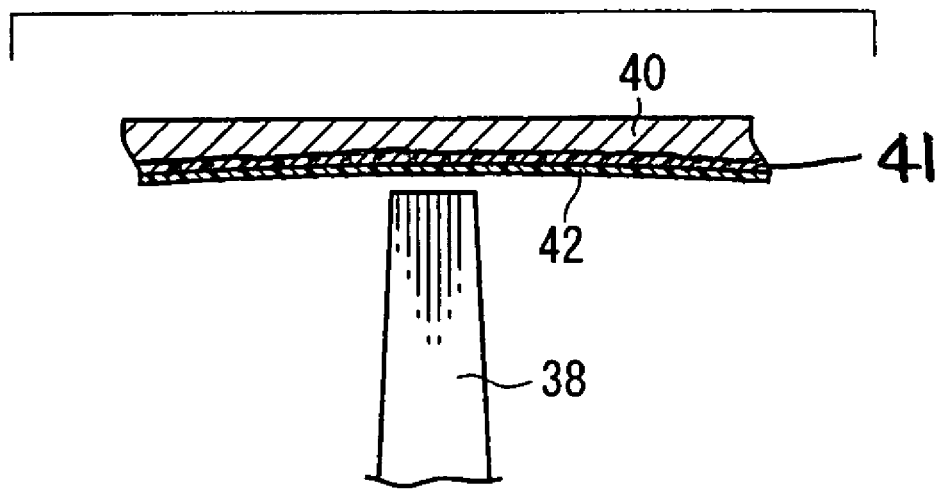
FIG. 3 is a magnified view as viewed in a direction of the arrow A shown in FIG. 2.

An end of the turbine blade 38 and the shroud 40 are magnified and shown in FIG. 2. FIG. 3 shows a magnified view as viewed in a direction of the arrow A shown in FIG. 2. As clearly understood from FIGS. 2 and 3, a coating 42 is provided on the surface of the shroud 40. Owing to the presence of the coating 42, the clearance between the end of the turbine blade 38 and the shroud 40 is decreased.

In this embodiment, the turbine blade 38 is made of an Ni-based alloy. No abrasive layer is provided for the turbine blade 38 unlike other turbine blades adopted for general gas turbine engines.

On the other hand, the shroud 40 is made of an Ni-based alloy. The coating 42 provided on the surface of the shroud 40 is made of an alloy of Co-32% Ni-21% Cr-7.5% Al-0.5% Y (numerals indicate % by weight) which has a low hardness, i.e., which is soft as compared with the Ni-based alloy as the material of the turbine blade 38. The coating 42 functions as an abradable layer which is abraded upon the sliding contact of the turbine blade 38 as described later on.

The porosity of the coating 42 is 5% to 30% by volume. If the porosity is less than 5% by volume, then the coating 42 is excessively dense, and the abrasion resistance is excessively increased. That is, the abrasion hardly occurs when the turbine blade 38 is in sliding contact. If the porosity exceeds 30% by volume, brittleness or fragility is increased. Therefore, the amount of abrasion of the coating 42 is increased when the turbine blade 38 is in sliding contact. Consequently, the clearance between the end of the turbine blade 38 and the shroud 40 is increased in a short period of time, and the efficiency of the rotary operation of the turbine blade 38 is quickly deteriorated. The porosity is preferably about 10% by volume.

The shroud 40 is prevented from the transfer of heat owing to the presence of pores in the coating 42, even when the high temperature and high pressure gas contacts the coating 42 and/or when frictional heat is generated upon sliding contact of the end of the turbine blade 38. In other words, the coating 42 having a porosity of 5% to 30% by volume is also excellent in thermal insulation performance. Therefore, it is also possible to avoid the occurrence of thermal deformation of the shroud 40.

The oxygen content of the coating 42 is not more than 2% by weight. The coating 42, in which the oxygen content is small as described above, is extremely hardly exfoliated from the shroud 40. Further, the coating 42 is excellent in oxidation resistance. Therefore, the coating 42 is not corroded and functions as the abradable layer over a long term even when the coating 42 is exposed to the high temperature and high pressure gas.

The gas turbine engine 10 according to the embodiment of the present invention is basically constructed as described above. Next, its function and effect will be explained.

When the gas turbine engine 10 (see FIG. 1) is operated, the fuel is injected into the communication chamber 24 from the fuel nozzle 26, and the compressed air is fed under the pressure from the high pressure compressor 22. When the air-fuel mixture obtained by mixing the fuel and the compressed air is ignited and burned, the high temperature and high pressure gas at about 800° to 1200° C. is produced.

Accordingly, the high pressure turbine 28 is rotated at a high speed. During this process, the turbine blades 38 of the high pressure turbine 28 are thermally expanded, and their ends are finally in sliding contact with the coating 42 provided on the shroud 40.

In this situation, the coating 42 is soft in quality as compared with the material (Ni-based alloy) of the turbine blades 38. Therefore, abrasion occurs in the coating 42. That is, in this case, the abrasion resistance of the ends of the turbine blades 38 is higher than that of the coating 42. Accordingly, the coating 42 functions as the abradable layer. The quick abrasion of the coating 42 decreases the force acting on the turbine blades 38. Therefore, the turbine blades 38 can be prevented from breakage.

The coating 42 makes it possible to extremely decrease the clearance between the end of the turbine blade 38 and the shroud 40. Therefore, it is also possible to avoid the deterioration of the efficiency of the rotary operation of the turbine blades 38.

Further, the pores in the coating 42 remarkably prevent the transfer of heat. Therefore, the heat is hardly transferred to the shroud 40. Thus, the shroud 40 is successfully prevented from thermal deformation.

Further, the coating 42 is excellent in oxidation resistance, because the oxygen content is not more than 2% by weight. Therefore, the coating 42 functions as the abradable layer without being corroded over a long term even when the coating 42 is exposed to the high temperature and high pressure gas.

Furthermore, the shroud 40 is not abraded, because the abrasion occurs on the coating 42. It is a matter of course that the ends of the turbine blades 38 are not abraded as well. Therefore, it is unnecessary to replace the shroud 40 or the turbine blades 38. Accordingly, the maintenance cost is not high as well.

As described above, the turbine blades 38 and the shroud 40 can be prevented from the abrasion without increasing maintenance cost by using simple and convenient structure in which the coating 42, which is soft as compared with the material of the turbine blades 38, is provided on the shroud 40.

Further, it is also possible to reduce the production cost of the gas turbine engine, because it is unnecessary to provide any abrasive layer on the turbine blades 38.

When the thickness of the coating 42 becomes not more than a predetermined value as a result of the sliding contact between the shroud 40 and the ends of the turbine blades 38, the coating 42 can be formed again.

The coating 42 can be provided on the surface of the shroud 40, for example, as follows.

First, a raw material powder of the alloy of Co-32% Ni-21% Cr-7.5% Al-0.5% Y is prepared.

The particle size of the raw material powder is not more than 125 μm. If the powder having particle sizes exceeding 125 μm is used, the porosity of the coating 42 is hard to be 5% to 30% by volume. It is preferable to use the powder having particle sizes of not more than 75 μm. In particular, when the powder having small particle sizes about 40 μm are used, then it is possible to obtain the coating 42 which has extremely satisfactory abrasion performance, in other words, it is possible to obtain the coating 42 which is easily abraded.

In order to sort the raw material powder by particle sizes, the raw material powder may be sieved.

Subsequently, the raw material powder having the particle sizes as described above is thermally sprayed onto the surfaces of the shroud members of the shroud 40 by the high velocity oxygen-fuel (HVOF) thermal spray method. When the thermal spray is performed as described above, the coating 42 is formed. The thickness of the coating 42 may be, for example, 0.5 to 2.0 mm. If the thickness is less than 0.5 mm, it is difficult to function as the abradable layer. On the other hand, coating having a thickness exceeding 2.0 mm tends to exfoliate from the shroud member during the thermal spray onto the shroud member. More preferably, the thickness of the coating 42 is 0.75 to 1.5 mm.

In the case of the plasma thermal spray method which is a general technique for providing the abradable layer, the plasma temperature arrives at 5000° to 10000° C. On the contrary, in the case of the HVOF method, the temperature can be relatively low, i.e., about 3000° C. Therefore, oxidation of the raw material powder is inhibited. Thus, the oxygen content of the coating 42 can be not more than 2% by weight. In particular, when the raw material powder has particle sizes of about 40 μm, it is also possible to obtain the coating 42 in which the oxygen content is extremely small, i.e., about 0.5% by weight. The coating 42 as described above is hardly exfoliated from the shroud 40, and the coating 42 is also excellent in oxidation resistance.

When the HVOF method is carried out by using the raw material powder in which the particle sizes are not more than 125 μm, the porosity of the obtained coating 42 is within a range of 5% to 30% by volume. In other words, when the particle sizes of the raw material powder are established as described above, the porosity of the coating 42 can be controlled to be within the range of 5% to 30% by volume.

Subsequently, the coating 42 is provided on the each of the shroud members in the same manner as described above. The shroud members, on which the coating 42 is formed as described above, are incorporated into predetermined positions to manufacture the shroud 40. Further, other members are incorporated to construct the gas turbine engine 10.

When the thickness of the coating 42 becomes not more than a predetermined value as a result of the operation of the gas turbine engine 10, the coating 42 may be formed again in accordance with the process described above.

As described above, according to the method of producing the gas turbine engine 10 concerning the embodiment of the present invention, the coating 42, which is excellent in oxidation resistance and thermal insulation performance and which easily causes abrasion, can be provided by simple and convenient operation in which the particle sizes of the raw material powder are sorted. Further, it is unnecessary to provide an abrasive layer on the turbine blade 38. Therefore, the production cost of the gas turbine engine 10 can be reduced as well by this production method.

In the embodiment described above, the material of the turbine blade 38 is the Ni-based alloy, and the coating 42 is the alloy of Co-32% Ni-21% Cr-7.5% Al-0.5% Y. However, the present invention is not limited to the combination as described above. Any combination may be available provided that the constitutive material of the coating 42 has a low hardness, i.e., has low abrasion resistance as compared with the constitutive material of the turbine blade 38.

For example, when the constitutive material of the turbine blade 38 is the same as that described above, the coating 42 may be made of stabilized zirconia in which $Y_2O_3$ forms solid solution at about 8 mole %. In this case, an intermediate layer, which is composed of, for example, an alloy of M—Cr—Al—Y, would be interposed between the shroud 40 and the coating 42.

"When the coefficient of thermal expansion of the shroud 40 is different from that of the coating 42, an intermediate layer 41 may be interposed. By the intermediate layer 41, the difference in coefficient of thermal expansion between the shroud 40 and the coating 42 is absorbed. Therefore, when the thermal expansion and contraction of the shroud 40 and the coating 42 are repeated by a number of start-ups and stops of the gas turbine engine 10, it is possible to inhibit the exfoliation of the coating 42 from the shroud 40".

This embodiment has been explained by the case in which the coating 42 is provided on the shroud 40. However, there is no limitation thereto. The present invention may be applicable to any casing provided that the casing surrounds a rotary member.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A gas turbine engine comprising turbine blades which rotate together with a rotary shaft and a shroud which surrounds said turbine blades,
   wherein no hard abrasive layer is provided on said turbine blade for said shroud,
   wherein said shroud has an abradable layer which has a hardness lower than that of a material of said turbine blades, and said abradable layer is formed on a surface of said shroud, and
   wherein said abradable layer is formed by thermally spraying only a raw material powder sieved to have a particle size not more than 125 μm by a high velocity oxygen-fuel method so as to have a porosity of 5% to 30% by volume and an oxygen content of not more than 2% by weight.

2. The gas turbine engine according to claim 1, wherein said abradable layer is composed of an alloy of M-Cr-Al-Y provided that M represents Ni, Co, or Ni-Co.

3. The gas turbine engine according to claim 2, wherein said abradable layer is composed of an alloy of Co-32% Ni-21% Cr-7.5% Al-0.5% Y provided that numerals indicate percent by weight.

4. The gas turbine engine according to claim 1, further comprising an intermediate layer which is disposed between said shroud and said abradable layer in order to absorb a difference in coefficient of thermal expansion.

5. The gas turbine engine according to claim 1, wherein said porosity of said abradable layer is 10% by volume.

6. The gas turbine engine according to claim 1, wherein said abradable layer is made of stabilized zirconia.

7. The gas turbine engine according to claim 1, wherein said abradable layer has a thickness of 0.5 to 2.0 mm.

8. The gas turbine engine according to claim 1, wherein said raw material powder is sieved to have a particle size not more than 75 μm.

* * * * *